United States Patent [19]

Hess

[11] Patent Number: 4,958,793
[45] Date of Patent: Sep. 25, 1990

[54] STANCHION

[76] Inventor: Norman B. Hess, 12611 Neon Way, Granada Hills, Calif. 91344

[21] Appl. No.: 345,281

[22] Filed: May 1, 1989

[51] Int. Cl.$^5$ ............................................. F16M 13/00
[52] U.S. Cl. .................................. 248/122; 248/231.6; 248/316.6; 248/288.3; 248/229; 403/391; 403/396
[58] Field of Search ...................... 248/122, 181, 188.5, 248/187, 218.4, 229, 231.6, 124, 179, 316.6, 288.3; 403/391, 396, 388, 77, 122

[56] References Cited

U.S. PATENT DOCUMENTS

| | | | |
|---|---|---|---|
| 369,971 | 9/1887 | Stillman | 248/316.6 X |
| 768,819 | 8/1904 | Palmer | 248/231.6 X |
| 2,733,035 | 1/1956 | Rocheleau | 248/124 |
| 3,425,713 | 2/1969 | McCauley | 248/181 X |
| 4,544,120 | 10/1985 | Lowell et al. | 248/122 |

Primary Examiner—Karen J. Chotkowski
Attorney, Agent, or Firm—Jack C. Munro

[57] ABSTRACT

A stanchion to which is to be attached a structure with this structure to be located in a particular fixed position. The stanchion permits adjusting movement of the structure to a desired location with this adjusting movement being spaced from supporting surface such as the ground or the floor. In order to provide for this adjusting movement, there is included a universal joint in conjunction with the stanchion. This universal joint utilizes a single handle which when loosened will permit the structure to be moved in both a horizontal and a vertical plane and also to be tiltable a limited amount relative to the vertical plane.

9 Claims, 2 Drawing Sheets

STANCHION

BACKGROUND OF THE INVENTION

The field of this invention relates to stanchions and more particularly for a stanchion with a locating for a structure in a fixed position spaced from a supporting surface.

At times, there is a need to locate a given structure in a fixed position relative to a supporting surface and also to facilitate adjusting movement of that structure to then be fixed in a particular position. A typical structure would be a colored screen that could be used as a background in conjunction with photography or motion pictures. Screens are to be maneuvered and when located in a particular position, it is desired to fix that screen in that position.

In the past, stanchions have been provided to achieve the fixing in position of screens and also to facilitate the adjusting movement of the screen to a particular position. However, the stanchions of the past have provided only two degrees of movement which is movement in a horizontal plane and movement within a vertical plane. At times, it is desirable to locate the screen in other than a precisely vertical position, in other words assuming a tilting position from the vertical. Known stanchions within the prior art have not permitted such tilting movement.

Also, most such stanchions of the prior art included a universal joint which had two adjusting knobs with one knob to be loosened to permit movement of the screen in the horizontal plane and that knob is then tightened once the desired horizontal position was obtained. Then, the screen is moved within the vertical plane and a second knob is then tightened once the desired vertical position has been obtained. It is common to locate a screen at a desired horizontal position, then fix that position, and then locate that screen in the desired vertical position, and then fix that position. Most often it is necessary to then go back and readjust the horizontal position and refix that position and then go back and readjust the vertical position and refix that position. Small adjustments may be difficult which require relocating of the entire stand. Further handle adjustments may then be necessary. In the field of photography, and motion pictures, all of this adjustment uses up valuable time and is quite costly.

It would be desirable to utilize a single knob which would permit simultaneous movement in both the horizontal and vertical positions and once a desired position is obtained, that knob is tightened thereby fixing in position the supported screen in both the horizontal and vertical planes.

SUMMARY OF THE INVENTION

The apparatus of the present invention defines a mounting rod at its outer or upper end. To this mounting rod is to be attached an exterior structure such as a screen or other similar type of device. This mounting rod is mounted within a through opening formed between a pair of clamping members. Passing through these clamping members and connecting them together is a clamping rod. The outer end of this clamping rod is threadably secured to a handle. The inner end of the clamping rod passes through a ball member and connects to a longitudinally adjustable tube assembly. Tightening of the handle secures the position of the mounting rod and the position of the clamping members on the ball as well as the position of the ball member on the longitudinally adjustable tube assembly. The longitudinally adjustable tube assembly is mounted onto a base with this base being adapted to be placed onto a supporting surface.

The primary objective of the present invention is to provide a stanchion which permits a greater degree of adjustment of the structure which it supports than what was previously possible with prior art stanchions.

Another objective of the present invention is to provide for adjustment in multiple directions with a single tightening knob being used to fix all directions of movement simultaneously.

DETAILED DESCRIPTION OF THE SHOWN EMBODIMENT

Figure 3:
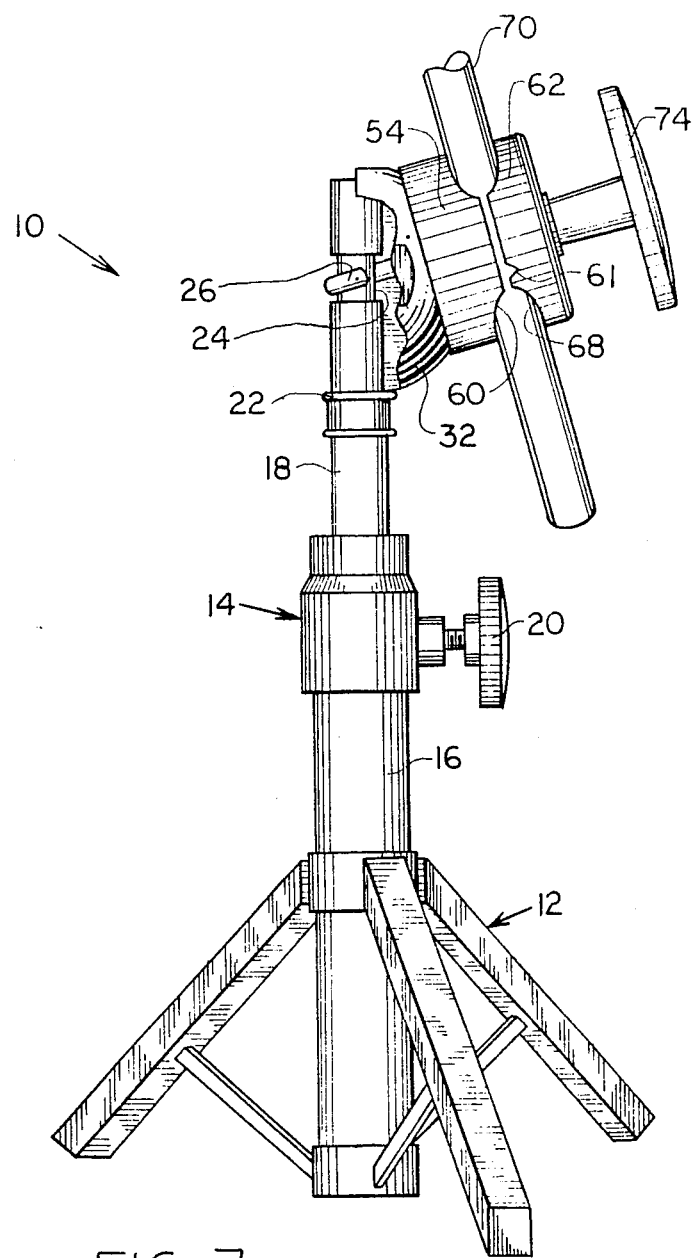
FIG. 3 is a side elevational view of a typical stanchion within which is incorporated the universal joint of FIGS. 1 and 2.

Referring particularly to the drawings, there is shown in FIG. 3 a stanchion 10 which is composed of a tripod base 12 from which extends an adjusting tube assembly 14. The adjusting tube assembly 14 is composed of an outer tube 16 within which is telescopingly located an inner tube 18. Inner tube 18 is capable of being telescopingly movable relative to the outer tube 16 and once a particular desired longitudinal movement has been obtained, it can be fixed in that position by tightening of handle 20.

Mounted on the inner tube 18 is a collar 22 which is fixed in position. The portion of the inner tube 18 that extends outward or above collar 22 includes an annular recess 24. That annular recess 24 is to engage with the inner surface of a hook 26 of a threaded clamping rod 28. The tube 18 is to rest within half circular through opening 30 of a half circular shaped ball member 32. Ball member 32 includes opposing beveled side surfaces 46. The purpose of the side surface 46 is strictly for ornamentation.

The threaded clamping rod 28 is conducted through an oversized hole 48 formed within the ball member 32. Also, included within the interior surface of the ball member 32 and connecting to the half circular through opening 30 is a cutout area 50 which is to provide for clearance for the hook member 26. The threaded clamping rod 28 is conducted through a hole 52 of a first clamp member 54. The clamp member 54 includes a concave recess 56 which is formed to have the same radius as the exterior surface of the ball member 32. The exterior surface of the ball member 32 is to rest in a close conforming manner within the recess 56.

The interior surface of the first clamp member 54 includes a pair of half cylindrical openings 58 and 60. These openings 58 and 60 are located parallel to each other. It is noticed that the diameter of the opening 58 is less than the diameter of the opening 60.

A second clamp member 62 is to abut against the first clamp member 54. Centrally located within the second clamp member 62 is a hole 64 which is to be in alignment with the hole 52 and through which is to extend the threaded clamping rod 28. The interior surface of the clamp member 62 is basically planar with the exception of half cylindrical longitudinal through openings 66 and 68. Openings 66 is to be in alignment with the opening 58 thereby forming a cylindrical through opening by the joined together clamp members 62 and 54. At the same time, the openings 68 and 60 also connect together to form a larger diametered through opening. The mounting rod 70 is to be located within the through opening defined by half circular openings 60 and 68. It is understood that the mounting rod 70 can be adjusted longitudinally relative to the clamp members 54 and 62.

It is to be understood that the through opening formed by openings 58 and 66 are to connect with a smaller diametered rod (not shown) similar to rod 70. Also, a much smaller diametered rod (not shown) similar to rod 70 may be secured clamped in position by V-shaped notches 61.

The outer end of the clamping rod 28 is conducted through a conventional washer 72 and threadably engages with a handle 74.

Figure 1:
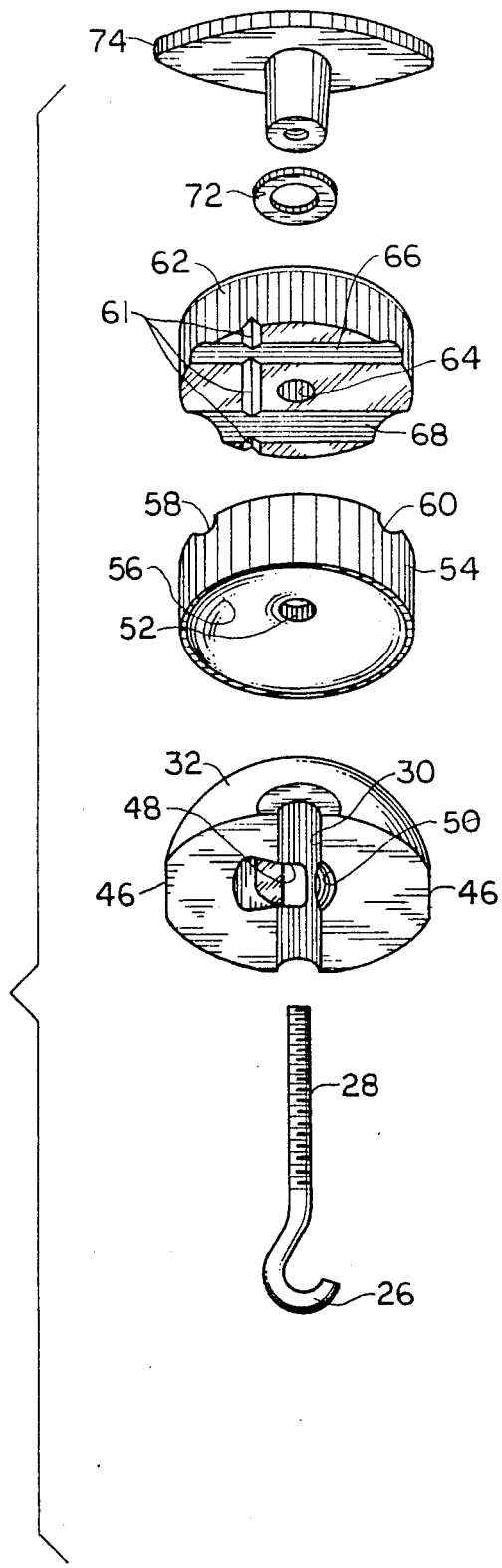
FIG. 1 is an exploded isometric view, taken generally in one direction, of the universal joint included within the stanchion of the present invention which provides for adjusting movement of the stanchion.
Figure 2:
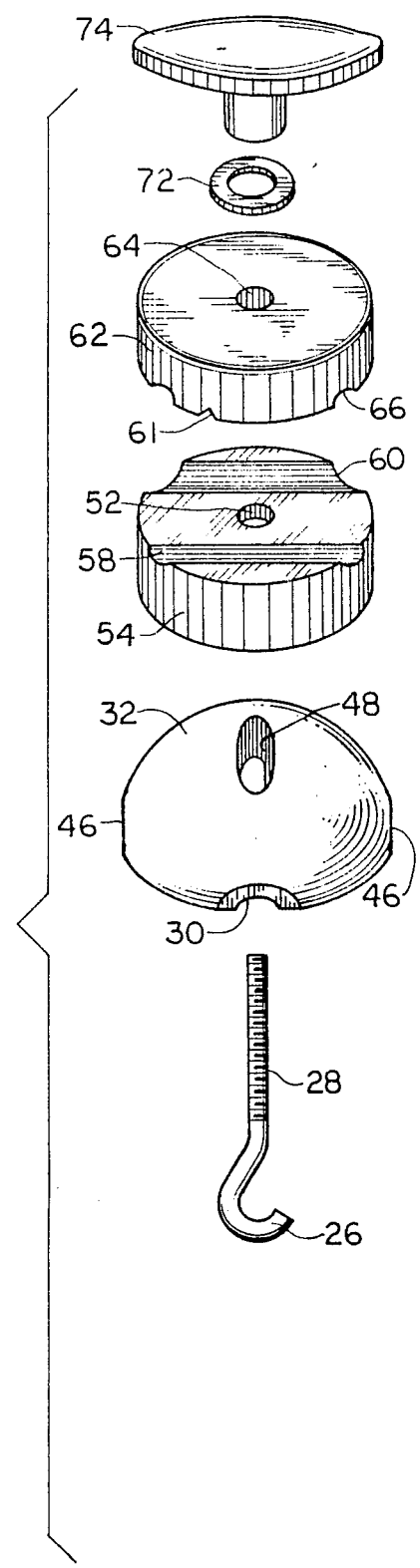
FIG. 2 is an exploded isometric view, similar to FIG. 1, but taken generally in a reverse direction.

The operation of the universal joint shown specifically in FIGS. 1 and 2 of the drawings in conjunction with the stanchion shown in FIG. 3 is as follows: Attached to the mounting rod 70 is to be an exterior structure that is to be supported such as a planar screen member or other similar type device. Actually, the rod 70 may be attached to a separate universal joint which is similar to what is shown in FIGS. 1 and 2 to provide a greater degree of adjustment for the exterior structure which is in turn mounted in conjunction with that separate universal joint. However, for purposes of this invention, it is only necessary to discuss a single universal joint with it being understood that duplication of the universal joints may be within the scope of this invention.

The mounting rod 70 is to be adjustable longitudinally relative to the clamping members 54 and 62. Clamping members 54 and 62 are capable of being pivoted about the clamping rod 28 when the handle 74 is in a loosened position. This causes the mounting rod 70 to move through a substantially vertical plane. The mounting rod 70 as well as the clamp members 54 and 62 can also move through a substantially horizontal plane by pivoting of the hook portion 26 of the threaded clamping rod 28 within the recess 24 of the inner rod 18. Still further, the rod 70 can be moved to various inclined positions by being tilted such as is clearly shown in FIG. 3, this tilting being relative to the vertical plane. This tilting is permitted due to the sliding of the exterior surface of the ball member 32 within the recess 56. The limits of the movement is established by the size and configuration of the oversized opening 48 which will permit the threaded clamping rod 28 to move therewithin. Once a particular established position for the mounting rod is obtained, the operator is to tightly rotate the handle 74 which will tightly bind the hook member 26 within the recess 24 which in turn will tightly secure together the recess 56 and the exterior surface of the ball member 32 and also tightly clamp together the clamp members 54 and 62 about the mounting rod 70. It is to be noted that a single handle 64 is used to achieve these three separate fixing positions.

What is claimed is:

1. A stanchion supporting a structure in a spaced relationship above a supporting surface in an established position, said stanchion comprising:

a base adapted to be located on a supporting surface;

a longitudinally adjustable tube assembly mounted on said base, said longitudinally adjustable tube assembly terminating at an upper end;

a universal joint mounted on said upper end, said universal joint including a clamping rod, said clamping rod engaging with said longitudinal adjustable tube assembly, said clamping rod being pivotable within a horizontal plane extending transverse to said longitudinal adjustable tube assembly;

said universal joint including a pair of clamp members, said clamp members being pivotally mounted on said clamping rod;

a mounting rod located between said clamp members, said mounting rod being movable within a substantially vertical plane, the structure being adapted to be mounted on said mounting rod;

a ball member mounted on and carried by said clamping rod, said ball member located between said longitudinally adjustable tube assembly and said clamp members, said ball member being mounted on said longitudinally adjustable tube assembly, said ball member having a spherical exterior surface, said clamp members being mounted on said spherical exterior surface, said clamp members being moved in said horizontal plane along with said clamping rod, said clamp members being movable on said spherical exterior surface, said universal joint including a means for permitting limited tilting movement of said clamping rod and said clamp members as well as said mounting rod relative to said horizontal plane; and a handle mounted on said clamping rod, said handle to be movable between a loosened position and a tightened position, with said handle in said loosened position said clamping rod being movable within said horizontal plane and said mounting rod being movable within said vertical plane and said clamping rod being tiltable, with said handle in said tightened position said mounting rod being fixedly located.

2. The stanchion as defined in claim 1 wherein: one of said clamping members including an oversized through hole, said clamping rod being conducted through said oversized through hole, said oversized through hole comprising a portion of the means for permitting tilting movement of said clamping rod relative to said horizontal plane.

3. The stanchion as defined in claim 1 wherein: said clamping rod having a free outer end comprising a hook, said hook to engage with said longitudinally adjustable tube assembly.

4. The stanchion as defined in claim 3 wherein: said longitudinally adjustable tube assembly includes an annular recess, said hook being located within said annular recess, said annular recess limiting the longitudinal movement of said hook on said longitudinally adjustable tube assembly.

5. The stanchion as defined in claim 1 wherein: said clamping members forming at least one through opening, said mounting rod being mounted within said through opening.

6. The stanchion as defined in claim 5 wherein: there being a plurality of said through openings, said through openings being of various sizes, a particular size of said through opening is to engage only with a particular range of sizes of said mounting rod.

7. The stanchion as defined in claim 6 wherein:
one of said clamping members including an oversized through hole, said clamping rod being conducted through said oversized through hole, said oversized through hole comprising a portion of the means for permitting tilting movement of said clamping rod relative to said horizontal plane.

8. The stanchion as defined in claim 7 wherein: said clamping rod having a free outer end comprising a hook, said hook to engage with said longitudinally adjustable tube assembly.

9. The stanchion as defined in claim 8 wherein:
said longitudinally adjustable tube assembly includes an annular recess, said hook being located within said annular recess, said annular recess limiting the longitudinal movement of said hook on said longitudinally adjustable tube assembly.

* * * * *